US009856729B2

(12) United States Patent
Ayris

(10) Patent No.: US 9,856,729 B2
(45) Date of Patent: Jan. 2, 2018

(54) APPARATUS FOR ALIGNING DRILLING MACHINES

(71) Applicant: Minnovare Limited, Bentley (AU)

(72) Inventor: Michael Ayris, Mundaring (AU)

(73) Assignee: MINNOVARE PTY LTD., East Perth (AU)

(*) Notice: Subject to any disclaimer, the term of this patent is extended or adjusted under 35 U.S.C. 154(b) by 408 days.

(21) Appl. No.: 14/380,020

(22) PCT Filed: Feb. 20, 2013

(86) PCT No.: PCT/AU2013/000152
§ 371 (c)(1),
(2) Date: Aug. 20, 2014

(87) PCT Pub. No.: WO2013/123555
PCT Pub. Date: Aug. 29, 2013

(65) Prior Publication Data
US 2016/0017670 A1  Jan. 21, 2016

(30) Foreign Application Priority Data

Feb. 22, 2012 (AU) ................................ 2012900668
Jun. 29, 2012 (AU) ................................ 2012902786

(51) Int. Cl.
*E21B 47/02* (2006.01)
*E21B 7/02* (2006.01)
(52) U.S. Cl.
CPC .............. *E21B 47/02* (2013.01); *E21B 7/025* (2013.01)

(58) Field of Classification Search
CPC . E21B 15/04; E21B 47/02; E21B 7/02; E21B 7/022
See application file for complete search history.

(56) References Cited

U.S. PATENT DOCUMENTS

| 4,833,787 | A | * | 5/1989 | Van Steenwyk | ....... G01C 21/16 33/302 |
| 5,208,653 | A | * | 5/1993 | Mark | ...................... H01S 3/139 356/467 |
| 5,383,524 | A | * | 1/1995 | Rinnemaa | ............... E21B 7/025 173/1 |
| 6,315,062 | B1 | | 11/2001 | Alft et al. | |

(Continued)

FOREIGN PATENT DOCUMENTS

| JP | 8320228 | 12/1996 |
| WO | WO 01/61140 | 8/2001 |
| WO | WO 2011/057319 | 5/2011 |

OTHER PUBLICATIONS

Jianli, Li et al.; Fuzzy Modeling and Compensation of Scale Factor for MEMS Gyroscope; The Free Library by Farlex, Publication Mechanika; Geographic Code9CHIN; Jul. 1, 2011.

(Continued)

*Primary Examiner* — Shane Bomar
(74) *Attorney, Agent, or Firm* — Heisler & Associates

(57) ABSTRACT

An alignment apparatus for aligning drilling machines, the alignment apparatus comprising a casing and mounting means. The mounting means allowing, in use, for a true north seeking sensing means to be aligned with the drilling machinery to be aligned. The alignment apparatus being capable of displaying azimuth and pitch information to a user, so that the drilling machinery can be aligned as required.

18 Claims, 2 Drawing Sheets

(56) References Cited

U.S. PATENT DOCUMENTS

| | | | |
|---|---|---|---|
| 8,122,974 B2* | 2/2012 | Kosoric | E21B 7/022 173/1 |
| 8,264,226 B1* | 9/2012 | Olsson | G01V 3/15 324/326 |
| 9,423,503 B2* | 8/2016 | Cole | E21B 47/09 |
| 2004/0089474 A1* | 5/2004 | Noureldin | G01C 21/16 175/45 |
| 2005/0155794 A1 | 7/2005 | Wright | |
| 2008/0128171 A1 | 6/2008 | Weston et al. | |
| 2008/0230270 A1* | 9/2008 | Eilo | E21B 7/025 175/26 |
| 2008/0252500 A1 | 10/2008 | Strandjord et al. | |
| 2010/0006337 A1 | 1/2010 | Kosoric | |
| 2011/0024191 A1* | 2/2011 | Boone | E21B 7/04 175/45 |
| 2012/0279782 A1* | 11/2012 | O'Reilly | E21B 15/04 175/40 |

OTHER PUBLICATIONS

Werniuk, Jane; Inco's Innovations; Canadian Mining Journal; Apr. 1, 2000.

GEM Elettronica; Polaris Fog-100 Fiber-Optic Gyrocompass; www.gemrad.com; Jun. 29, 2015.

* cited by examiner

APPARATUS FOR ALIGNING DRILLING MACHINES

FIELD OF INVENTION

The present invention relates to an apparatus for aligning drilling machines.

BACKGROUND OF INVENTION

The alignment of the initial position of a drill collar and therefore the initial direction of the drill hole being created is highly important, especially in areas such as mining where the accuracy of drill holes is crucial in ensuring that the correct blasting patterns or that cable bolts etc used to secure the rock face is correctly positioned. A number of differing methods have been used to limited success to ensure that the relative direction (azimuth) and angle (pitch) of a drill hole are correct.

Inaccuracies in azimuth measurements have a huge affect on the accuracy of the drill hole, with an error of 1 degree in azimuth over a 1000 meter drill hole causing and error of 12.3 meters.

Some methods of aligning the drilling collar rely on the use of a compass to measure magnetic north. Azimuth direction is determined as a bearing relative to magnetic north. Compass based techniques are also affected greatly by the type of ore body that is being worked on as well as the closeness of vehicles with steel frames etc.

Other examples of alignment methods have involved the use of surveyors to determine the relative direction (azimuth) and angle (pitch) that a drilling collar rod should contact the rock face to ensure that the hole is drilled in the correct manner. In underground mining operations especially this can be a laborious task as the limited space and distance requires a significant number of calculations to be performed to ensure that the correct azimuth and pitch are set for the drill rig prior to drilling. This requires that the surveyor take measurement after measurement until the crew operating the drill rig have manoeuvred the drill rig into position.

Other alignment methods rely on the use of GPS survey instruments, however, the nature of these instruments mean that they must have 'vision' of the global position system satellites and as such are not usable in heavily wooded areas or underground.

It has also been shown that the drill rig itself may block the 'vision' of the GPS survey instruments and therefore reduce the accuracy of the measurements produced. One of the many problems faced by GPS systems is they may take up to 10 minutes to determine the azimuth depending upon the number of satellites that are visible. If there are no available satellites no azimuth may be calculated.

Another known problem of GPS survey instruments is that may not be moved once a bearing has been calculated. Therefore it is often necessary for the satellite detection process to be conducted a number of times to ensure correct azimuth alignment before drilling can commence.

SUMMARY OF THE INVENTION

The present invention attempts to overcome at least in part the aforementioned disadvantages of previous drilling machine alignment apparatus.

In accordance with one aspect of the present invention there is provided an aligning apparatus for aligning the drilling collar of a drilling rig or machine both for relative direction (azimuth) and angle (pitch).

BRIEF DESCRIPTION OF THE DRAWINGS

The present invention will now be described, by way of example, with reference to the accompanying drawings, in which.

DESCRIPTION OF THE INVENTION

Referring to the Figures, there is shown apparatus and a method for determining the alignment of a drill collar.

Figure 1:
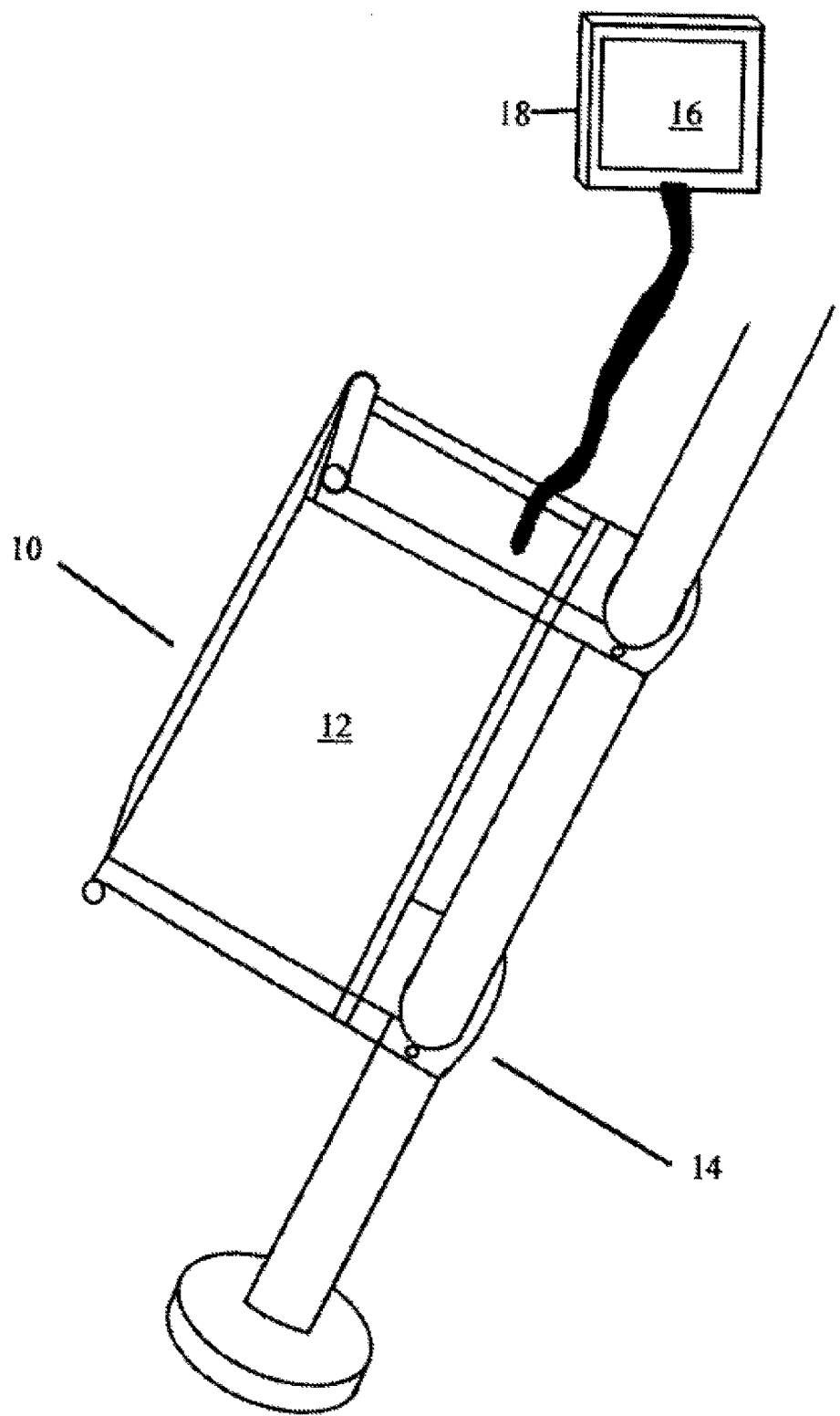
FIG. 1 is a perspective view of the aligning device attached to a drill collar with a drill rod inserted in accordance with the present invention.

FIG. 1, shows an aligning apparatus 10 in accordance with the present invention. The aligning apparatus 10 comprises a casing 12 attached to which is a mounting means 14. Arranged with in the casing 12 is at least one mutually orthogonal fibre optic gyroscope (FOG). The aligning apparatus 10 preferably further comprises at least one set of mutually orthogonal accelerometers. The aligning apparatus 10 may further comprise other electronic measuring devices such as to determine relative magnetic field strength and control electronics with the ability to perform pulse modulation on the laser used within the FOG.

Alternatively, the sensing means may comprise a plurality of true north seeking micro electrical mechanical system (MEMS) devices. The plurality of MEMS devices being chosen for their ability to determine true north, the relative rotation of the earth about its axis. Preferably, the plurality of MEMS devices are arranged to be mutually orthogonal to each other.

Further, the sensing means may comprise other known rotational sensing means capable of determining true north or the relative rotation of the earth about its axis such as gimbal based gyroscopes of strap-down gyroscopes.

The Aligning apparatus 10 preferably further comprises at least one set of mutually orthogonal accelerometers. The aligning apparatus 10 may further comprise other electronic measuring devices, such devices being able to determine relative magnetic field strength or environmental condition data relating to the operating environment of the aligning apparatus.

The aligning device 10 preferably also comprises control electronics with the ability to perform pulse modulation on the laser used within the FOG or equipment for reducing or at least ameliorating signal noise, error or drift in the readings taken from the MEMS sensors.

In accordance with one preferred embodiment of the present invention the mounting means 14 is arranged to allow the aligning apparatus 10 to be mounted directly to a drilling collar rod as shown in FIG. 1, such that one of the axes of the aligning apparatus 10 is parallel to the drilling rod.

Figure 2:
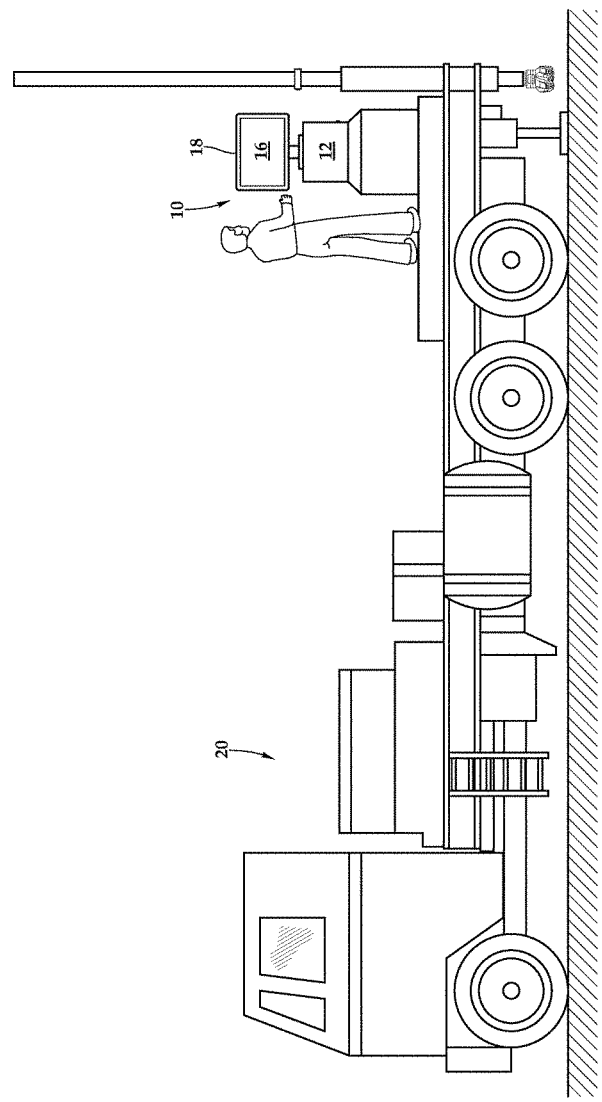
FIG. 2 is a side elevation view of a vehicle with a drill collar attached thereto and with the aligning device and display mounted to the vehicle rather than to the drill collar.

In accordance with yet another preferred embodiment of the present invention, the aligning apparatus 10 may further comprise a connection to a display device 18 which is remote to the aligning apparatus 10, with relevant information being displayed on a screen 16. The screen 16 may be configured to display information such as alignment (azimuth) and angle (pitch) of the aligning apparatus 10. The display device 18 may be a handheld device or may be incorporated or integrated into the dash board of a vehicle 20 (FIG. 2) to which the drilling equipment is mounted.

In accordance with a preferred embodiment the screen display 16 is arranged such that the driver of the vehicle may see the display device 18 so that the displayed information may be used to guide or position the vehicle.

In accordance with yet another preferred embodiment of the present invention the connection between the alignment apparatus 10 and the display device 18 may be in the form of wireless communication such as a Wi-Fi or short range wireless radio wave data transmission system, such as that provided under the certification trademark BLUETOOTH administered by Bluetooth SIG, Inc. of Washington, D.C., USA.

In accordance with a further preferred embodiment of the present invention there is provided a method of determining the alignment of a drilling collar rod. The method begins with the alignment apparatus 10 of the present invention being powered on, provided with the latitude it is to operate at and allowed to stay in a stationary position to complete its calibration and power-on self-test (POST) sequence. Using the provided latitude, and once the alignment apparatus 10 has completed its calibration and POST sequence the alignment apparatus 10 is able to detect the relative rotation of the earth and therefore the direction of true north relative to the alignment apparatus 10.

Once the alignment apparatus 10 has completed it calibration and POST sequence it will display on the display device 18 the relative bearing that the alignment apparatus is currently on. The operator of the system will then be able to position in the alignment apparatus 10 so that the mounting means 14 engage the drilling collar rod. The FOG and accelerometers of the alignment apparatus 10 captures the movement of the alignment apparatus 10 so that relative bearing of the alignment apparatus 10 to true north is constantly calculated.

In this manner it is then possible to align the drilling collar rod to the required alignment and angle whilst the alignment apparatus 10 is still attached to the drilling collar rod with the relative alignment and angle being constantly calculated.

In use, the apparatus of the present invention is arranged to determine the alignment and angle of a drill collar. This process begins with the aligning apparatus 10 being powered on and being held stationary for a period of time. The aligning apparatus 10 once calibrated determines the direction of true north relative to the aligning apparatus 10.

Once true north is determined the aligning apparatus 10 is brought into close contact with the drilling collar rod, the aligning apparatus 10 is attached to the drilling collar rod by mounting means 14. The aligning apparatus 10 unlike many other true north seeking devices (such as the GPS survey instruments discussed above) is able to be moved once true north is detected, with any movement of the apparatus being captured by the FOG and the accelerometers of the aligning apparatus 10 and displayed the display device 18 appropriately.

With the aligning apparatus 10 attached to the drilling collar rod, the drill collar may be moved to the correct azimuth and angle alignment designated for that particular drill hole. As discussed above movement of the aligning apparatus 10 and the drill rod is possible with the advancements made by the combination of the FOG and the accelerometers wherein relative movement recorded by the alignment apparatus 10 is used to calculate relative changes in alignment and position of the aligning apparatus 10.

Using the information displayed on the screen 16 of the display device 18, the drilling collar rod alignment is able to be manipulated to ensure that the drilling collar rod is aligned correctly prior to drilling.

In accordance with another preferred embodiment of the present invention the aligning apparatus 10 may be affixed directly to the vehicle to which the drilling equipment is mounted. The aligning apparatus 10 is mounted in a fixed position on the vehicle and all alignment measurements taken are relative to the angle that the equipment is relative to the aligning apparatus 10. This will require additional sensor to be attached to the vehicle to determine the relative direction, incline and roll of the drilling equipment. In this manner the aligning apparatus 10 may be placed in a position where it will not be damaged during the normal operation of the drilling equipment.

The Applicant has found that it is possible to increase the accuracy of drilling collar placement to within 0.2 degree in both azimuth and pitch. This increase in accuracy allows further improvement in the overall accuracy of drilling operations, as accuracy errors compound during the drilling process. Further, known directional drilling techniques require an accurate assessment of the drilling collar to determine overall direction and accuracy.

The method of the present invention therefore allows the alignment and angle of the drilling collar rod to be determined at a greatly increased speed then any of the previously discussed methods of alignment. Further, the alignment of the drilling collar rod is of a much greater accuracy then other previously described methods.

Modifications and variations as would be apparent to a skilled addressee are deemed to be within the scope of the present invention.

The invention claimed is:

1. A drilling machinery orientation apparatus for measuring an orientation of a drilling machine prior to drilling a bore hole, the apparatus comprising;
    an orientation device; and
    a display device that is remote to the orientation device;
    the orientation device comprising:
        a mounting device enabling the orientation device to be mounted to a drilling machine for measuring the orientation of the drilling machine and detached from the drilling machine for drilling the bore hole;
        at least one gyroscope; and
        control electronics for measuring the orientation of the drilling machine with respect to true north;
    the orientation device being communicable with the display device for displaying directional information to an operator; and
    wherein the directional information enables the operator to axially align a drill rod of the drilling machine with a predetermined longitudinal axis of the bore hole.

2. A drilling machinery orientation apparatus according to claim 1, wherein the gyroscope comprises a mutually orthogonal fibre-optic gyroscope.

3. A drilling machinery orientation apparatus according to claim 2, wherein the orientation device further comprises at least one set of mutually orthogonal accelerometers.

4. A drilling machinery orientation apparatus according to claim 3, wherein the orientation device further comprises a magnetic field strength sensor.

5. A drilling machinery orientation apparatus according to claim 2, wherein the orientation device further comprises control electronics to perform pulse width modulation on a laser used within the fibre-optic gyroscope.

6. A drilling machinery orientation apparatus according to claim 2, wherein the display device is arranged to display the orientation and angle of the orientation device, the drilling machinery and the initial orientation of the bore hole created by the drilling machinery.

7. A drilling machinery orientation apparatus according to claim 6, wherein the display device is arranged to be mounted to a vehicle.

8. A drilling machinery orientation apparatus according to claim 6, wherein the display device communicates with the orientation apparatus via wireless communication.

9. A drilling machinery orientation apparatus according to claim 6, wherein the orientation apparatus is mounted to a vehicle and the relative direction of the drilling machinery is measured relative to the orientation device on the vehicle.

10. A drilling machinery orientation apparatus according to claim 1, wherein the gyroscope comprises a set of mutually orthogonal micro electronic mechanical system devices.

11. A drilling machinery orientation apparatus according to claim 10, wherein the orientation device further comprises control electronics for reducing signal noise, error and drift in readings taken from the micro electronic mechanical system devices.

12. A drilling machinery orientation apparatus according to claim 1, wherein the gyroscope comprises a gimbal based gyroscope.

13. A drilling machinery orientation apparatus according to claim 1, wherein the gyroscope comprises a strap down gyroscope.

14. A drilling machinery orientation apparatus according to claim 1, wherein the mounting device is configured to enable the orientation device to be mounted to the drill rod.

15. A drilling machine orientation device apparatus according to claim 1, wherein the display device is hand held.

16. A method of orientating drilling machinery comprising:

attaching a drilling machinery orientation apparatus to the drilling machinery so that the orientation apparatus coincides with one axis of the drilling machinery to be aligned, the orientation apparatus comprising:
an orientation device; and
a display device that is remote to the orientation device;
the orientation device comprising:
    a mounting device enabling the orientation device to be mounted to a drilling machine;
    at least one gyroscope; and
    control electronics for measuring the orientation of the drilling machine with respect to true north;
the orientation device being communicable with the display device for displaying directional information to an operator;
wherein the directional information enables the operator to axially align a drill rod of the drilling machine with a predetermined longitudinal axis of a bore hole;
powering on the orientation apparatus;
providing the orientation apparatus with the latitude it is to operate on;
allowing the orientation apparatus to calibrate;
manipulating the drilling machinery until the required alignment is achieved;
detaching the orientation device from the drilling machinery prior to drilling the hole; and
drilling the hole.

17. A method of orientating drilling machinery according to claim 16, further comprising tracking the relative motion of the orientation device after it is calibrated to determine the relative motion of the orientation device.

18. A method of orientating drilling machinery according to claim 16, further comprising displaying on the display device information relating to the relative azimuth and pitch orientation of the orientation device.

* * * * *